(12) United States Patent
Liu et al.

(10) Patent No.: US 9,937,481 B1
(45) Date of Patent: Apr. 10, 2018

(54) PROCESSING EQUIPMENT FOR USING ORGANIC VAPOR TO REMOVE WATER FROM ELECTRODE MATERIALS AND CELL CORES

(71) Applicant: GM GLOBAL TECHNOLOGY OPERATIONS LLC, Detroit, MI (US)

(72) Inventors: Haijing Liu, Shanghai (CN); Meiyuan Wu, Shanghai (CN); Zhiqiang Yu, Shanghai (CN); Xiusheng Zhang, Shanghai (CN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/405,364

(22) Filed: Jan. 13, 2017

(51) Int. Cl.
| | |
|---|---|
| *B01J 19/24* | (2006.01) |
| *H01G 13/04* | (2006.01) |
| *H01M 4/23* | (2006.01) |
| *F26B 21/14* | (2006.01) |
| *H01M 10/42* | (2006.01) |

(52) U.S. Cl.
CPC ............... *B01J 19/24* (2013.01); *F26B 21/14* (2013.01); *H01G 13/04* (2013.01); *H01M 4/23* (2013.01); *H01M 10/4207* (2013.01); *B01J 2219/24* (2013.01)

(58) Field of Classification Search
CPC ........ B01J 19/24; B01J 2219/24; B01J 15/00; F26B 9/06; F26B 21/14; H01G 13/04; H01M 4/23
See application file for complete search history.

(56) References Cited

U.S. PATENT DOCUMENTS 2,293,453 A * 8/1942 Clark .................... F26B 21/145
34/408

FOREIGN PATENT DOCUMENTS

WO 2017000157 A1 1/2017

\* cited by examiner

*Primary Examiner* — Lessanework Seifu
(74) *Attorney, Agent, or Firm* — Reising Ethington P.C.

(57) ABSTRACT

A reaction vessel in the form of a box is sized to closely contain electrode elements or core cell elements of a lithium-based or sodium-based battery or capacitor for contacting of the electrode material, placed in the reaction vessel, with a flowing gaseous stream of an inert carrier gas and vapor of an organic solvent of water for removing residual water from the porous electrode material elements which are to be infiltrated with a non-aqueous electrolyte solution. Complementary equipment is provided for delivering the gaseous stream to the reaction vessel with predetermined portions of carrier gas and organic vapor at a predetermined temperature, pressure, and flow rate.

20 Claims, 3 Drawing Sheets

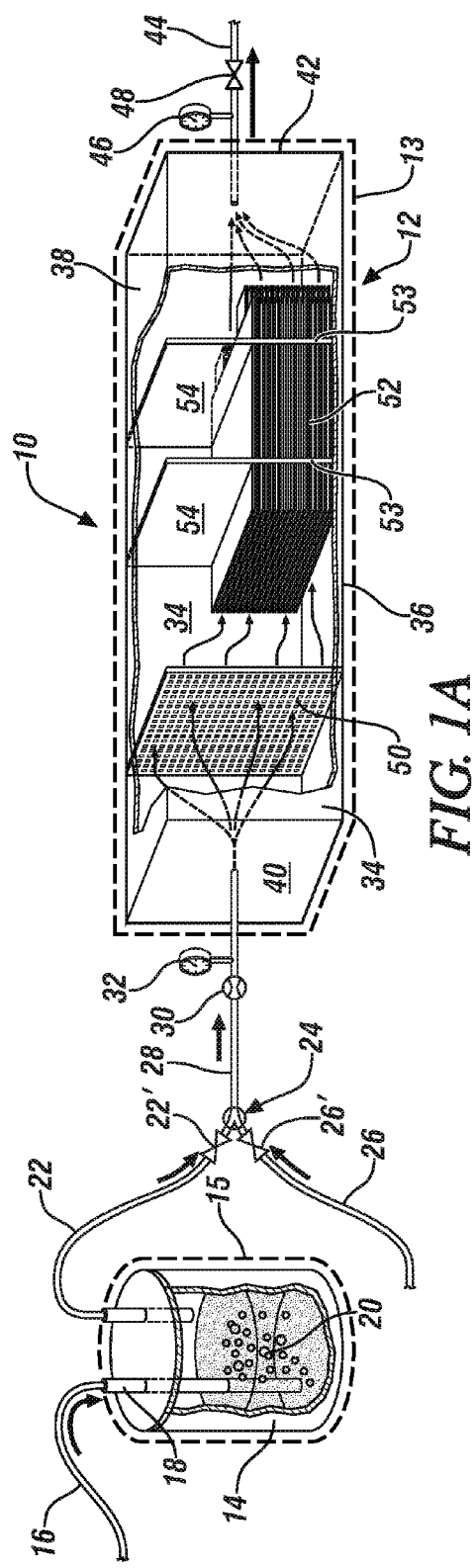

PROCESSING EQUIPMENT FOR USING ORGANIC VAPOR TO REMOVE WATER FROM ELECTRODE MATERIALS AND CELL CORES

TECHNICAL FIELD

Processing equipment is disclosed for directing and enabling the flow of a gaseous mixture of a carrier gas and the vapor of a water-miscible organic compound (such as ethanol) through particulate electrode materials in an assembly of electrodes or cell cores for the purpose of removing residual water from the battery or capacitor cell materials. The composition, temperature, and pressure of the flowing stream and its flow rate and path are managed by use of the equipment devices so that residual water is effectively removed from the cell materials before a non-aqueous electrolyte solution is added to the cell materials.

CROSS-REFERENCE TO RELATED APPLICATION

Some of the inventors of this disclosure are also inventors in PCT/CN2015/082753, filed in the State Intellectual Property Office of China on 30 Jun. 2015, and titled "Method for Reducing Residual Water Content in Battery Material." Some of the content of this related application are presented in the present text and the entirety of the text and drawings of this related patent application are incorporated herein by reference.

INTRODUCTION

Secondary, or rechargeable, lithium-ion batteries or lithium-sulfur batteries are often used in many stationary and portable devices, such as those encountered in the consumer electronic, automobile, and aerospace industries. The lithium class of batteries has gained popularity for various reasons, including a relatively high energy density, a general nonappearance of any memory effect when compared to other kinds of rechargeable batteries, a relatively low internal resistance, and a low self-discharge rate when not in use. The ability of lithium batteries to undergo repeated power cycling over their useful lifetimes makes them an attractive and dependable power source. Non-aqueous electrolyte solutions are used in such batteries and in capacitors utilizing compatible electrode compositions. Any water carried into the battery or capacitor materials from the electrode, separator, or electrolyte materials, obtained during processing of the materials, may have an adverse effect on the performance of the electrochemical cell materials or on the life of the battery, capacitor, or hybrid battery-capacitor cells.

In applications in which the lithium based batteries are larger than coin-shaped batteries, the battery assembly often comprises a predetermined number (e.g., ten to fifteen) of like-shaped positive electrodes and negative electrodes that are assembled (e.g., linearly stacked) in an alternating arrangement with intervening like-shaped porous separators. The negative electrodes (anodes during cell discharge) are typically formed of porous layers of resin-bonded particles of active negative electrode material mixed with smaller particles of conductive carbon. The porous negative electrode material layers are often resin-bonded to opposing sides of a copper current collector foil. Similarly, the positive electrodes (cathodes during cell discharge) are typically formed of porous layers of resin-bonded particles of active positive electrode material mixed with smaller particles of conductive carbon. The porous positive electrode material layers are often resin-bonded to opposing sides of an aluminum current collector foil. Typically the separators are porous layers of polymeric material such as polypropylene. In other lithium based battery assemblies a relatively long positive electrode strip, an intervening porous separator strip, and a negative electrode strip, each of like predetermined lengths and widths, are rolled into a battery or capacitor structure. The assembled battery structures are placed in a suitable thin-wall container and the container carefully filled with a solution of a suitable lithium electrolyte salt dissolved in a compatible non-aqueous solvent. The container is then sealed, usually with only electrode terminal extending from the container and exposed to the ambient atmosphere.

The preparations of the electrode materials, the electrodes, and the cell core assemblies of electrodes and separators have required working in a carefully managed, very low-humidity, air-atmosphere work-environments (e.g., about 0.1% to 0.2% relative humidity, R.H.) in order to assure that the residual water content of the assembled battery is reduced and maintained at a suitably low level, preferably less than about 600 ppm of the active electrode material. Such low humidity environments are expensive to prepare and maintain, and the workers usually require special clothing. The above-identified PCT patent application discloses methods for removing residual water from electrode materials or electrodes or cell cores that have been processed in a more conventional (and less expensive to maintain) working environment in which the ambient air has a relative humidity of, for example, about twenty percent. The disclosed methods provide a relatively low cost and useful method for removing residual water from battery or capacitor materials at one or more selected stages of the preparation of the electrodes and the assembly of the battery or capacitor members.

An example of a practice of the method of the PCT application for reducing residual water content in a battery material includes placing the battery or capacitor material, having residual water adsorbed therein such as from the working environment, in a channel substantially sealed from an ambient environment. A gaseous mixture of an inert carrier gas, such as argon, and the vapor of a liquid organic compound that is readily miscible with water, such as ethanol, is caused to flow through the battery material in the channel. The inert gas/organic vapor mixture includes an organic solvent vapor which is present in an amount effective to hydrogen bond (or to otherwise effectively bond) with at least some of the water molecules adsorbed in the particles of battery material and associated materials to which the electrode materials are bonded. The gaseous mixture is caused to flow in intimate contact with the porous battery material for a predetermined amount of time, at a predetermined temperature, and at a predetermined pressure in order to remove water from the battery materials. The organic solvent vapor, having at least some water molecules bonded thereto, is then removed from the battery material and may be processed for reuse. As stated, the removal of residual water into the flowing gaseous inert gas/organic vapor stream is managed to produce battery material having reduced residual water content. But practices of the water removal process require the use of a combination of appropriate processing equipment.

Practices of this effective and useful process are benefited by the design of processing equipment that enables and enhances the adaptation of the described organic vapor employing process of residual water removal from particulate electrode materials, and/or from formed electrodes, and/or from core cells which contain a stack-up of alternating positive and negative electrodes, spaced apart with intervening porous separators.

SUMMARY

Several processing steps are required in the manufacture of large capacity, secondary, lithium-ion batteries and capacitors and lithium-sulfur batteries and capacitors, and the presence of adsorbed water is a concern in the assembly of cell materials. The water must be removed at one or more of such processing steps before the non-aqueous liquid electrolyte is introduced into an assembly of cell elements or cores.

For example, the manufacture of each electrode typically initially requires the preparation of a slurry of a mixture of micrometer-size particles of active electrode material and smaller conductive carbon particles dispersed in a solution or dispersion of a suitable binder resin. The slurry of electrode material is spread in generally uniformly thick layers on opposing major surfaces of a compatible, often rectangular or square, metal current collector foil. The current collector foil typically has an uncoated tab extending from one side for electrical connection with one or more other electrodes in an assembly of positive and negative electrodes and intervening separators. The coatings of electrode material may be pressed onto the foil surfaces and dried or cured to form uniform, bonded layers of porous active electrode material carried on the central current collector foil. Each electrode may be trimmed or notched for its electrode shape and function, and then it is stacked, rolled, or otherwise assembled with a separator and an opposing electrode. The tabs of selected positive electrodes and negative electrodes in an assembly may be connected, for example, by welding to form parallel electrical connections or series connections in the assembly to obtain the intended voltage and current delivery requirements of the assembled electrochemical cell.

One or more cells may then be placed in a suitable flexible pouch (for example, a flexible metal film coated with a polymeric material) or other container. Any gas or vapor in the container is evacuated and the small pores of the electrode materials and separators in the cell are back-filled with a suitable non-aqueous electrolyte solution. The cell container is then closed, typically with only electrical terminals extending from the interior of the cell container.

In prior practices of forming the battery or capacitor cells, typically only the preparation of the slurry or electrode materials was conducted in an atmosphere of air with 20% relative humidity. The remaining battery preparation steps were conducted in an atmosphere of dried air with about 0.1% to 0.2% RH. Even under such rigorous processing conditions, assembled battery units often required a vacuum/heating dehydration step before the liquid non-aqueous electrolyte was infiltrated into the pores of the cells.

In accordance with practices of this disclosure, most or all of the above described electrode making and cell assembling steps may generally be performed in an environment of air with about 20% RH. But, in one or more stages of the battery making process, electrodes or cell cores are subjected to the above described residual water removal process. And the vapor-using organic solvent-water removal process is practiced in equipment that is conceived and intended to readily accept and closely contain a predetermined loading of process battery components for effective water-removing exposure to a gaseous steam of a carrier gas and the vapor of a suitable organic compound.

This disclosure provides a reaction vessel or device and related gaseous stream-producing equipment for removing water from a batch of particulate electrode materials or from such electrode materials which have been bonded onto a metal foil current collector as an electrode(s). The vessel may also be used to remove water from cell cores of assembled electrodes and intervening separators. In preferred embodiments the design of the reaction vessel is adapted for removal of residual water from a stack-up or group of electrodes or of cell cores of like-shaped electrodes and separators.

In a preferred illustrative embodiment, the reaction vessel contains four flat complementarily-shaped side walls which are equal in length and width. The side walls are aligned to define an inner volume which is rectangular (or square) in cross-section. In preferred embodiments, two of the side walls are vertical and two of the side walls are horizontal, i.e., top and bottom walls, such that the walls engage each other at right-angles and the reaction vessel has a box-like shape. In this embodiment, a rectangular or square end wall is located at each end of the assembled side walls. One of the side walls, often the top side wall, is removable for placement of the battery materials into the reaction vessel for subsequent conduct of the water removal process using a gaseous stream of organic solvent vapor in a generally inert carrier gas. The removable side wall also permits removal of the de-watered battery components from the reaction vessel.

The end wall at the upstream end of the reaction vessel has an opening to accommodate a flow line in which the gaseous stream of inert gas and organic water-extracting vapor for water removal is introduced into the vessel. And the end wall at the downstream end of the vessel has an opening for removal of the water-containing gaseous stream from the vessel. The interior shape and volume of the reaction vessel, as defined by the arrangement of its side walls, is designed to accommodate a predetermined number of containers of particulate electrode material, or stacks of electrodes, or stacks of cell cores, each of which require removal of residual water for subsequent assembly into finished batteries, capacitors, or hybrid battery/capacitors. A vertically standing gas sieve plate at or near the upstream end of the reaction vessel is used to deflect and direct a narrow flow of gaseous stream entering the upstream end of the vessel into a flow of the gaseous stream that is generally uniform across the cross-section of the vessel. Thus, the inlet gaseous stream is expanded to flow generally uniformly into the porous layers of electrode material that are bonded in the stacked electrode members or into the cell cores. In specific processing applications in which the amount of battery members loaded into the water-removal vessel does not fill the whole cross-section of the vessel, suitably shaped, removable planar baffles may be placed in unfilled cross-section space within the vessel to direct all gas/vapor flow through the present loading of battery materials within the vessel.

Further, in accordance with embodiments of this invention, a related equipment unit is provided for creating a mixed stream of organic solvent vapor and an inert carrier gas for introduction into the upstream end of the reaction vessel.

For example, a suitable volume of a liquid organic solvent, such as ethanol, maybe contained in a solvent box or vessel and maintained at a desired temperature and pressure. A pressurized source of dry carrier gas, such as nitrogen, argon, or air, is provided. Gas-containing and flow apparatus is provided for directing a flow of the carrier gas to and into the top of the solvent vessel and downwardly into the contained volume of liquid solvent. The carrier gas is distributed throughout the lower portion of the liquid volume so that the gas bubbles up through the volume of organic liquid and creates a carrier gas-solvent vapor stream. The gaseous stream of pressurized carrier gas and organic vapor flows from above the contained liquid level, out of the solvent vessel through a flow line that ultimately leads to inlet end of the reaction vessel. The flow line contains a suitable valve for controlling the flow rate of the gaseous stream.

In most applications, a separate second stream of pressurized inert carrier gas will be used to adjust the desired proportions of organic solvent vapor and inert carrier gas that is supplied to the inlet of the reaction vessel. A stream of pressurized inert gas is also used to purge residual organic vapor from battery electrodes or battery cell cores in the reaction vessel at the completion of a de-watering step. The flow of pressurized inert gas is provided in a second flow line for delivering the inert gas to the inlet end of the reaction vessel. This second flow line has a valve for controlling the flow rate of the inert gas.

The flow line for the valve-controlled gaseous stream of pressurized carrier gas and organic vapor and the flow line for the valve-controlled flow of inert gas merge in a common junction with a single gaseous stream leaving the junction for delivery to the reaction vessel and for conduct of the water removal process. Thus, each separately controlled flow line may contribute to the intended predetermined gas composition that is to be delivered to the reaction vessel. In general, a combined carrier gas/solvent vapor stream is directed through a flow meter, a manometer, and then into the inlet at the upstream end of the reaction vessel. Suitable management, which may be programmed, of the separate valves in the two flow lines of the gas delivery equipment enables control over the composition of the processing material stream entering the reaction vessel. For example, even a stream that is rich in organic vapor content or a stream that is pure inert gas may be delivered to the inlet of the reaction vessel. There is also a manometer and valve at the outlet of the reaction vessel. Thus, the composition, temperature, pressure, flow rate, and total volume of the carrier gas/solvent vapor stream flowing through the reaction vessel can be suitably monitored and managed.

The above described reaction vessel is sized and shaped, as is the related gas stream generation and flow equipment, for forming and controlling the flow of organic solvent which is adapted to remove water from battery or capacitor materials of known size and shape. For example, the vessel may be sized to accommodate rectangular electrodes having side dimensions of up to 300 mm×300 mm, and core cells that are formed of an assembly of like sized electrodes and porous separators. The members will be loaded and stacked in the reaction vessel so as to substantially fill the cross-section of the reaction vessel and to enable and direct flow of the carrier gas/organic water-solvent vapor through the porous layers of reactive electrode materials of the electrodes and through the pores of the thin separator layers. For example, electrodes and cell cores may be stacked flat on one major side, or placed on their edges, to enable and direct the flow of the water removal gaseous stream through the porous layers of electrode material bonded to the faces of their current collector foils. As described in detail below in this specification, vertical gas baffles may be placed, if necessary, to prevent vapor flow in any open space remaining around the electrodes or cell cores and between the walls of the reaction vessel.

Other advantages of our disclosure will be apparent from descriptions of preferred embodiments.

BRIEF DESCRIPTION OF THE DRAWINGS

FIG. 1A is an illustration of a flow-through reaction vessel for the use of a gaseous flow stream of a carrier gas and organic vapor to remove residual water from a stack of rectangular electrodes for a lithium-ion battery. The left side of FIG. 1A also contains a schematic illustration of a vessel containing an organic liquid and a source of pressurized inert gas, together with valve-controlled flow lines for forming and directing the flow stream of a carrier gas and organic vapor to an inlet end of the reaction vessel. FIG. 1A illustrates an embodiment in which the stack of electrodes does not fill the vapor flow cross-section of the reaction vessel.

FIG. 1B is schematic illustration of a flow-through reaction vessel as illustrated in FIG. 1A in which the gaseous flow stream is removing water from a stack of battery cell cores that does not fill the vapor flow cross-section of the reaction vessel.

FIG. 2A also illustrates that battery or capacitor materials, produced in the dry air environment, may still have to be subjected to one or more special heat and vacuum processing steps in order to suitably reduce the residual water content of the materials.

DESCRIPTION OF PREFERRED EMBODIMENTS

Figure 1C:
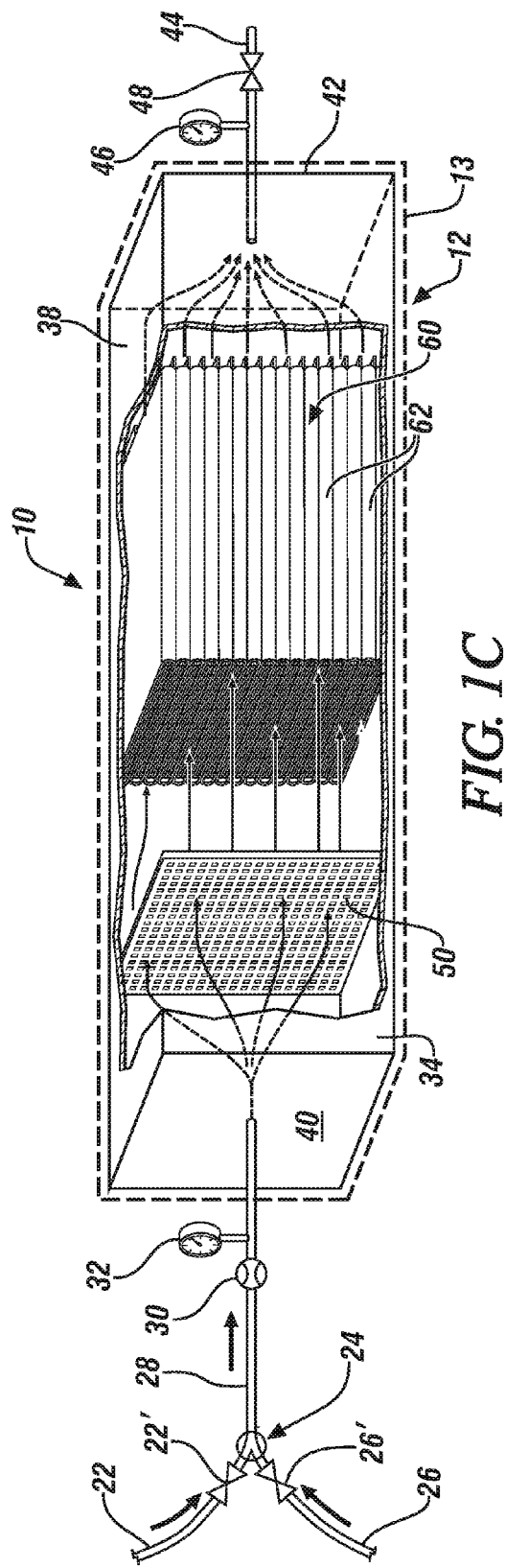
FIG. 1C is a schematic illustration of a flow-through reaction vessel as illustrated in FIG. 1A in which the gaseous flow stream is removing water from a stack of cell cores that are laid flat on a major side in a stack of cell cores that fills the vapor flow cross-section of the reaction vessel.

Lithium salts, such as one of $LiPF_6$, $LiBF_4$, or $LiCl_4$, are generally used as the solute of an electrolyte solution for a lithium battery. These salts act as the source of lithium ion supply in the electrochemical function of the battery. Lithium and fluorine-containing salts such as lithium hexafluorophosphate, $LiPF_6$, may be chosen for use in the electrolyte because they are suitable for contributing a high voltage and high ion-flow capacity in a battery. However, the electrolyte based on such fluoride solutes is very sensitive to moisture. In the electrolyte solution $LiPF_6$ can dissociate into small amounts of $LiF$ and $PF_5$, and the phosphorous pentafluoride is readily reactive with any nearby water to form hydrogen fluoride (HF). The resulting hydrogen fluoride gas can corrode the cathode and the current collectors, decrease the capacity of the battery, and/or reduce the life cycle of the battery.

As such, the existing manufacturing process for making batteries and/or battery materials typically uses a desiccant dehumidifier in the manufacturing environment. Normal levels of relative humidity (for example, 20% RH) may cause quality control problems in the lithium battery manufacturing process. Even ambient moisture present in the manufacturing room may degrade the "memory" characteristic (i.e., ability to hold charge) of the lithium. As such, the processing takes place in dry rooms, where the environment is made up of air with the dew point temperature being generally controlled at a very low relative humidity level (e.g., ranging from about 0.1% to about 5%, with one example being 0.5%).

Dry rooms, or environmental chambers, are generally built to house the manufacturing areas for batteries. Due to the reactive nature of the moisture in the air during lithium battery manufacturing, most lithium battery processes typically require a dry room dew point of from about −40° F. (−40° C.) to about −50° F. (−45° C.) or lower, (i.e., from about 0.6 to about 0.3 grains of moisture per pound (gr/#), respectively). The supply air moisture level may be required to be from about −60° F. (−51° C.) to about −100° F. (−73° C.) dew point (0.1 to 0.0 gr/#, respectively) when accounting for potential moisture migration into the dry room (even with an airlock entry way), and a potential slight latent gain within the room due to the workers. Therefore, maintaining the dry room with the low humidity level can require a burdensome amount of expensive energy and resources.

In the examples of the de-watering method disclosed in the above identified co-pending PCT Application, the need for the use of a dry room can be reduced to a single step during manufacturing of a battery and/or battery material. The elimination of a dry room during most of the manufacturing method can significantly reduce the cost of producing a battery. Furthermore, the overall residual water content in the battery material can be reduced to a smaller amount using less time and a lower temperature compared to some conventional methods of reducing the residual water content in the battery material. As a result, the reduction of the residual water content in the battery material may increase the life cycle, decrease corrosion, and reduce capacity loss of the battery.

This disclosure and invention provide apparatus and processing equipment for application of the disclosed water removal method in treating predetermined batch sizes of electrode material, or of groups of electrodes or groups of cell cores containing the battery or capacitor material. As will be described with reference to FIGS. 1A through 1D, processing equipment for providing both the water-removing gaseous stream for treating the electrode materials and for providing a suitably sized and shaped reaction vessel with a protective flow channel for removing water from the electrode material will be described. The composition and nature of the electrode material will be also be described.

Battery Materials

In an example, the battery material may be battery electrode material powder (which in addition to the particles of raw active material may include polymer binders, conductive fillers, etc.). A predetermined amount of particulate electrode material may be processed, for example, in a suitably porous container.

In a second example, the battery material may be incorporated as a porous layer in an electrode, and processed for water removal as a stacking of positive electrodes, negative electrodes, or both. Each electrode is typically formed of a layer of dry porous electrode-coating mixture, including active electrode material, polymer binder, and conductive filler, bonded to a current collector foil.

In a third example, the battery material may be a group or stacking of cell cores (anode, separator, and cathode). For example, each cell core is a stacked or a wound structure with positive and negative electrodes separated with a porous separator. It is to be understood that the battery material may be battery material powder, an electrode, and/or a cell core to be used in a lithium-ion battery, a lithium sulfur battery, a lithium air battery, a sodium sulfur battery, or a capacitor.

In the lithium air battery, the raw active material for the negative electrode is lithium metal and the raw active material for the positive electrode is mesoporous carbon including metal catalysts (e.g., manganese, cobalt, ruthenium, platinum, silver, or a mixture of cobalt and manganese).

In the lithium-ion battery or the lithium sulfur battery, suitable raw active materials for the negative electrode include lithium, lithium titanate, silicon, graphite, soft carbon, and hard carbon. In the sodium sulfur battery, a suitable raw active material for the negative electrode is sodium.

In the lithium-ion battery, suitable raw active materials for the positive electrode include lithium manganese oxide spinel ($LiMn_2O_4$); lithium cobalt oxide ($LiCoO_2$); a nickel-manganese oxide spinel [$Li(Ni_{0.5}Mn_{1.5})O_4$]; a lithium iron polyanion oxide, such as lithium iron phosphate ($LiFePO_4$) or lithium iron fluorophosphate ($Li_2FePO_4F$); a layered nickel-manganese-cobalt oxide (LiNMC or NMC) [$Li(Ni_x Mn_y Co_z)O_2$ or $Li(Ni_x Mn_y Co_z)O_4$, where each of x, y, and z may be ⅓ (i.e., LiNMC 1,1,1), or the Ni content may be more, where x=0.6 and each of y and z=0.2 (i.e., LiNMC 6,2,2), or where x=0.8 and each of y and z=0.1(i.e., LiNMC 8,1,1), or where x=0.5, y=0.3, and z=0.2 (i.e., LiNMC 5,3,2), or the Mn content may be more than Ni and Co]; $xLi_2MnO_3 \cdot (1-x)LiMO_2$ (M is composed of any ratio of Ni, Mn and/or Co); $LiNi_x M_{1-x}O_2$ (M is composed of any ratio of Al, Co, and/or Mg); aluminum stabilized lithium manganese oxide spinel ($Li_x Mn_{2-x}Al_y O_4$); lithium vanadium oxide ($LiV_2O_5$); $Li_2MSiO_4$ (M is composed of any ratio of Co, Fe, and/or Mn), and any other high efficiency nickel-manganese-cobalt material. By "any ratio" it is meant that any element may be present in any amount. So, for example, M could be Al, with or without Co and/or Mg, or any other combination of the listed elements.

In the lithium sulfur battery or the sodium sulfur battery, raw active materials for the positive electrode include a sulfur-carbon composite having a ratio of sulfur to carbon ranging from 1:9 to 9:1.

In the capacitor, suitable raw active materials include metal oxides (e.g., $PbO_2$), metal sulfides (e.g., $TiS_2$), carbon (e.g., activated carbon, graphite), and polymers (e.g., polyaniline).

In any of the example electrodes, suitable binders include polyvinylidene fluoride (PVdF), an ethylene propylene diene monomer (EPDM) rubber, carboxymethyl cellulose (CMC), styrene-butadiene rubber (SBR), polyacrylic acid (PAA), polyvinyl alcohol (PVA), sodium alginate, styrene-butadiene rubber carboxymethyl cellulose (SBR-CMC), polyethylene oxide (PEO), poly(acrylamide-co-diallyl dimethyl ammonium chloride), cross-linked polyacrylic acid-polyethylenimine, other water-soluble or organic solvent based binders, or any other suitable binder material. Also in any of the example electrodes, the conductive filler may be a high surface area carbon, such as acetylene black or a furnace carbon black such as Super P.

The electrolyte for a lithium-ion battery is a lithium salt dissolved in one or more organic liquid solvents. Examples, of suitable salts include lithium hexafluorophosphate (LiPF$_6$), lithium tetrafluoroborate (LiBF$_4$), lithium perchlorate (LiClO$_4$), lithium hexafluoroarsenate (LiAsF$_6$), and lithium trifluoroethanesulfonimide. Some examples of solvents that may be used to dissolve the electrolyte salt include ethylene carbonate, dimethyl carbonate, methylethyl carbonate, propylene carbonate.

Typical electrolyte salts for a lithium-sulfur battery are lithium trifluoromethanesulfonate (Li[SO$_3$CF$_3$], LiTf), LiTFSI, LiPF$_6$, and LiClO$_4$, which are combined with a variety of solvents, such as the ethers tetrahydrofuran (THF), DME, and DIOX, as well as sulphones, carbonates, and glymes.

A typical electrolyte for lithium-air battery is a non-aqueous electrolyte of 1 M LiPF$_6$ in propylene carbonate (PC) for example.

Typical electrolyte salts for sodium-sulfur battery are NaClO$_4$ and NaCF$_3$SO$_3$, which are combined with a variety of solvents, such as EC, DMC, PC, DME and DOL, as well as gel polymer PVDF/HFP-TEGDME.

Typical organic electrolyte salts for capacitor are tetraethyl ammonium tetrafluoroborate (TEATFB) and lithium hexafluorophosphate, which are combined with a variety of solvents, such as PC and ACN. Organic electrolytes such as tetraethylammonium tetrafluoroborate dissolved in acetonitrile (TEA-BF4/ACN) are widely used in commercial supercapacitors Processing Equipment for Water Removal In accordance with practices of this invention, the flow-through channel of the reaction vessel for removing residual water from battery materials is provided with a cross-section and length for effectively and closely containing a desired amount of the electrochemical battery or capacitor materials to be processed. In many applications of lithium and sodium based batteries, capacitors, and battery/capacitor hybrids (often hereinafter referred to collectively, for brevity, as battery or batteries), rather large assemblies of groups of cells are required to produce the required energy and power requirements of battery. In such large batteries the individual electrodes and separators are often formed as relatively thin (e.g., uniformly up to about 150-250 micrometers in thickness) units having rectangular or square shapes of up to about 300 mm on each side. Stacks of such rectangular electrodes, generally of like two-dimensional shape and thickness may be processed for removal of residual water. Or stacks of assembled cell cores, comprising alternating positive and negative electrodes with interposed separators, or a long single wound separator, may be processed for removal of water. Thus, in accordance with preferred embodiments of this invention, reaction vessels with flow-through channels with rectangular cross-sections are often employed.

FIG. 1A is a schematic illustration of a grouping of processing equipment 10 for utilizing a gaseous stream containing the vapor of a suitable organic compound for extracting residual water from electrode materials for lithium or sodium batteries. Illustrated at the right side of the grouping of processing equipment 10 is a flow-through reaction vessel 12 having a length and a rectangular or square cross-section. When in use, reaction vessel 12 is closed to the ambient environment so as to best enable the removal of water from the battery materials being dried. The dashed line 13, enclosing flow-through reaction vessel 12, indicates that suitable insulation and heating (or cooling) means may be provided on or within the reaction vessel.

Illustrated at the left side of FIG. 1A, the grouping of processing equipment 10 further comprises a closed tank 14 (or like suitable container) for containing a volume of a suitable dry organic liquid 20, such as substantially pure ethanol. Provision may be made (indicated by the dashed-line 15 around tank 14) in or on closed tank 14 to insulate and heat or cool the selected organic liquid 20 in the tank 14. A suitable dry inert gas, such as argon, is delivered at a predetermined temperature and pressure through gas flow line 16 into flow tube 18 which directs the flow of inert gas into the top of tank 16 and below the surface of organic liquid 20. The flow of the inert gas vaporizes some of the organic liquid and carries organic vapor in an inert gas/organic vapor stream above the surface of the organic liquid and through flow line 22, exiting from the top of tank 14. Flow line 22 includes a valve 22' for controlling the flow rate of carrier gas and organic vapor in flow line 22. Flow line 22 leads to a flow junction 24, whose function will be described in more detail in a following paragraph of this specification. Preferably valve 22' is located in flow line 22 near its connection to flow junction 24.

A separate flow-line 26 delivers a separate stream of substantially water-free, inert gas, such as argon, to a second entry port of flow junction 24. Flow line 26 also contains a control valve 26' which is preferably located near the connection of flow line 26 with flow junction 24. Valves 22' and 26' are managed and controlled to deliver predetermined proportions of the inert carrier gas/organic vapor stream in flow line 22 and the inert gas stream 26 to flow junction 24. Extending from flow junction 24 is flow line 28 which leads to an inlet port in an end wall of flow rector 12 (the inlet port and end wall being further described below in this specification). Thus, the composition of the stream in flow line 28 is controlled by valves 22' and 26' in their respective flow lines 22, 26. Suitable mixtures of carrier gas and organic vapor can be managed for the de-watering process. Vapor-rich streams in flow line 28 can be formed by minimizing or eliminating the flow of inert gas from line 26. And a pure inert gas steam from flow line 26 may be supplied (by closing valve 22') in flow line 28, for example, for removing residual organic vapor from reaction vessel 12 at the completion of a de-watering operation.

Flow line 28 preferably is fitted with a flow meter 30 and manometer 32 for measuring the flow rate and flow pressure of the inert gas/organic vapor stream as it is delivered to the flow-through reaction vessel 12.

In the illustrative embodiment of FIG. 1A, flow-through reaction vessel 12 is formed of two flat vertical side panels 34, a flat bottom panel 36 and a flat top panel 38. In this embodiment the side panels 34, bottom panel 36, and top panel 38 are substantially identical in size and shape and engage each other at right angles. In each of FIGS. 1A-1D a major portion of the front side panel 34 is broken out to better illustrate the interior of the flow-through vessel 12 and its contents. One of the panels, suitably the top panel 38, is removable for placing predetermined groups or stacks of electrodes, cell cores, or the like into the interior volume of the flow-through reaction vessel 12. Flow-through reaction vessel 12 further comprises, at its left end, as illustrated in FIG. 1A, a generally square end panel 40, and, at its right end, a square end panel 42. End panel 40 serves as an inlet for the flow-through reaction vessel 12, having an opening to closely engage the end of flow line 28 just downstream of flow meter 30 and manometer 32. End panel 42 serves an outlet for the flow-through reaction vessel 12, providing an outlet for engagement with flow line 44. Flow line 44 serves to conduct the water-containing, gaseous stream that is leaving the flow-through reaction vessel to a suitable processing unit (not illustrated) for recovery of the constituents of the stream. Flow line 44 preferably contains a manometer 46 and a valve 48 for measuring the pressure of the exiting stream and for controlling its flow rate. Inlet end panel 40 and outlet end panel 42 may be shaped with funnel-like inlet and outlet sections (not illustrated) to spread inlet-gas flow and to collect outlet gas flow.

The respective panels, which are the structural members of the flow-through reaction vessel 12, may be formed, for example, of a suitable metal or metal alloy, or a polymeric material, or ceramic material which serves to support the battery materials being treated at the temperature and pressure of the gaseous flow stream.

As stated, the gaseous stream of carrier gas and organic water-extracting solvent vapor enters flow-through reaction vessel 12 through flow line 28 where it engages an opening in end panel 40. The flow stream in flow line 28 is confined and thus it abruptly expands as it enters the much larger interior volume of flow-through reaction vessel 12. A vertically and transverse standing (to the cross-section of vessel 12) square gas sieve 50 is placed adjacent inlet end panel 40 at a location to be engaged by the incoming gaseous stream and to spread and direct the flow of the gaseous steam more uniformly over the entire cross-section (which is square in the illustrated embodiments of reaction vessel 12) of the longitudinal volume which determines the permitted flow path of the interior structure of reaction vessel 12. Gas sieve 50 is suitably formed with horizontal and vertical rows of uniformly spaced through-holes, the locations of the holes extending from side to side of the sieve and from its top to bottom. Preferably, gas sieve 50 covers the whole cross-section of flow-through reaction vessel 12. Gas sieve 50 may be formed of a metal or metal alloy or polymeric or ceramic material which manage the gas flow at the temperature and pressure of the gas stream.

In the embodiment of FIG. 1A, a stack 52 of several individual battery electrodes has been placed in flow-through reactor 12. In this embodiment, the electrodes are placed lying on their large-area sides. The making of the electrodes has been substantially completed. In each electrode, uniform porous layers of resin-bonded, particulate electrode material particles, often mixed with electrically conductive particles, have been formed on both major surfaces of a compatible rectangular current collector foil with an uncoated connector tab extending from its top side. The stack 52 of electrodes may comprise all anodes, all cathodes, or mixtures of anodes and cathodes with intervening separators. In the example of FIG. 1A, the electrodes are stacked with a major face down on the bottom panel 36 of the reaction vessel 12 and with side edges lying close against the side panels 34 of the reaction vessel 12 so that the gaseous stream is better directed into the pores of the electrode materials.

In this example, the number of electrodes in stack 52 does not fill the vertical cross-section of reaction vessel 12. In order to direct the flow of the water-removing gaseous stream through the porous electrode layers of the stack 52, two suitable vertical baffle plates 54 have been placed to engage the top of the electrode stack 52, side panels 34, and top panel 38 so as to effectively force the flow of the water-removing gaseous stream through each of the porous layers of electrode material on the electrodes in the stack. The side edges of the one or more baffle plates 54 may be retained in guide retainers 53 on the side panels 34 of the flow through reaction vessel 12. Thus, flow-through reaction vessel 12 is sized and shaped to closely hold battery elements and to direct the flow of water-removing gaseous stream through the porous layers of the electrode material.

The stack 52 of de-watered electrodes may be removed by opening the top side 38 of flow-through reaction vessel 12.

FIG. 1B illustrates the use of components of assembly 10 (FIG. 1A) for water removal from a stack 60 of cell cores 62. The equipment illustrated in FIG. 1A for providing the generation of the gaseous water-removal stream is also used in FIGS. 1B-1D, but the illustration of the liquid storage vessel 14 and its contents and carrier gas inlet line are not repeated in FIGS. 1B-1D. The flow lines for the driver of the gas and vapor streams are illustrated in FIGS. 1B-1D.

Each cell core 62 is formed of a stacked assembly of alternating anodes and cathodes (positive or negative electrodes) separated by a long porous polymeric separator layer that is wrapped back and forth between the electrodes. The cell cores 62 are placed in a stack 60 with their major electrode faces parallel to the bottom panel 36 of the reaction vessel 12. The side edges of the stacked 60 cell cores 62 touch the vertical sides 34 of the flow through reaction vessel 12. The flow-through reaction vessel 12 and associated equipment for delivery of water removing gaseous stream are the same as illustrated in FIG. 1A. Since the horizontal stack 60 of vertical baffle plates does not fill the full vertical cross-section of vessel 12, edge-supported (retainers 53) vertical baffle plates 54 are again placed at the top surface of the stack 60 to direct the flow of the water-removing gaseous stream through the pores of the electrodes and separator(s) forming the cell cores 62.

FIG. 1C illustrates the use of components of assembly 10 (FIG. 1A) for water removal from a horizontal stack 60 of cell cores 62 that completely fills the gaseous stream flow cross-section of reaction vessel 12. Since, the stack 60 of cell cores fills the gas flow cross-section; the baffles 54 used in the embodiment of FIG. 1B are not required.

Figure 1D:
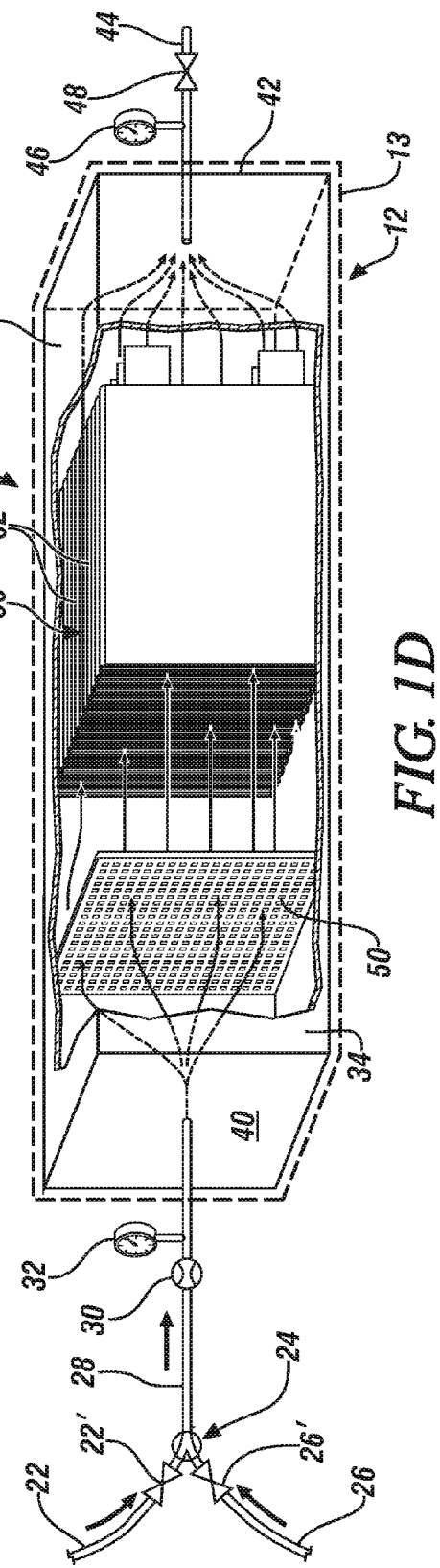
FIG. 1D is a schematic illustration of a flow-through reaction vessel as illustrated in FIG. 1A in which the gaseous flow stream is removing water from a stack of cell cores that are placed on their edges in a vertical stack of cell cores that fills the vapor flow cross-section of the reaction vessel.

In the embodiment of FIG. 1D the cell cores 62 are stacked on their edges. The width of the cell cores 62 in this vertical stack 60' in combination with the number of cell cores 62 fills the gaseous stream flow cross-section of reaction vessel 12 and no baffles are required.

Thus, the flow through reaction vessel 12 is sized and shaped for the removal of water from predetermined quantities of batches of battery elements of specified sizes and shapes. The use of a water removal equipment system 10 is intended to be utilized strategically so that much of the extended processing of the battery elements may be conducted in a normal air atmosphere of about 20% RH. Then, as will be described, the processing of a batch of battery elements for water removal may be conducted at one of more predetermined stages of the manufacturing processes to provide a finished battery or capacitor with a suitably low residual water content. This will be discussed in more detail below in this specification. But first it is helpful to describe the compositions of water removing gas streams that may be used in combination with the equipment of this invention.

The gaseous mixture entering reaction vessel 12 includes an organic solvent vapor and a carrier gas. In an example, the carrier gas is selected from an inert gas, a non-inert gas, or a mixture of an inert gas and a non-inert gas. The carrier gas generally has a high purity (e.g., at least 98% pure) and is relatively dry (e.g., water moisture content less than 500 ppm). As an example, $N_2$ used as the carrier gas may have a purity of 99.9% and less than 200 ppm water moisture.

Some suitable examples of inert gases include argon gas, helium gas, neon gas, krypton gas, xenon gas, radon gas, nitrogen gas, and mixtures thereof. Some suitable examples of non-inert gases include carbon dioxide gas, hydrogen gas, oxygen gas, air, methane gas, ethane gas, propane gas, and combinations thereof. In an example, the selected carrier gas is argon.

The organic solvent vapor in the gaseous mixture forms hydrogen bonds with at least some water molecules from the residual water in the battery material. The organic solvent vapor can form a hydrogen bond with the residual water due, in part, to the hydroxyl groups or oxygen atoms in the organic solvent vapor. It is believed that the hydrogen bonds between the organic solvent vapor in the gaseous mixture and the residual water interfere with the hydrogen bond structure of the residual water molecules. This interference destabilizes the molecular structure of the residual water. As a result, the residual water is easier to remove from the battery material.

Some examples of organic solvents to form the organic solvent vapor include any of alcohols, aldehydes, acids, ketones, ethers, furans, haloalkanes, and combinations thereof. Some examples of suitable organic solvents include a chlorine atom(s), a fluorine atom(s), an oxygen atom(s) or a hydrogen atom(s) and have a relatively low boiling point (i.e., <150° C. (<302° F.)), as these organic solvents can form a hydrogen bond with residual water molecules. Other examples of a suitable organic solvent has either an oxygen atom(s) or an —OH group(s) which can interfere the hydrogen bond structure of the residual water molecules.

Some examples of alcohols include methanol, ethanol, propanol, butanol, or combinations thereof. Some examples of aldehydes include formaldehyde, acetaldehyde, and combinations thereof. Some examples of acids include acetic acid, formic acid, and combinations thereof. Examples of ketones include acetone, butanone, and methyl ethyl ketone. Some examples of ethers include diethyl ether, methyl ethyl ether, and combinations thereof. Example of furans includes tetrahydrofuran and dihydrofuran. Examples of haloalkanes include chloroform and dichloromethane (i.e., methylene chloride). In an example, the organic solvent is ethanol.

It is to be understood that the organic solvent vapor may be present in the gaseous mixture in an amount ranging from greater than 0% to about 99.9% by volume based on a total volume of the gaseous mixture. In an example, the organic solvent is present in an amount ranging from about 5% to about 20% by volume. It is believed that any amount of organic solvent vapor may be used, depending, in part, on the predetermined time the gaseous mixture flows through the interior of the reaction vessel (e.g., reaction vessel 12 in FIGS. 1A-1D), the predetermined temperature of the interior of the reaction vessel when the gaseous mixture flows through it, and the predetermined pressure inside the reaction vessel when the gaseous mixture flows through it. The organic solvent volume concentration may be varied, depending upon the overall efficiency of water removal.

In an example, the predetermined time that the gaseous mixture flows through the battery material in the reaction vessel may range from about 0.5 hours to about 24 hours. In a further example, the predetermined time that the gaseous mixture flows through the reaction vessel ranges from about 0.5 hours to about 5 hours.

The predetermined temperature of the channel when the gaseous mixture flows through the reaction vessel may range from about 0° C. to about 300° C. The predetermined temperature of the channel refers to the temperature of the environment within the reaction vessel that surrounds the battery material. A temperature sensor may be positioned inside the reaction vessel in the proximity of the battery material. In an example, the temperature may range from about 120° C. to about 300° C., e.g., when the battery material is a battery material powder. In another example, the temperature may range from about 60° C. to about 150° C., e.g., when the battery material is an electrode. In yet another example, the temperature may range from about 30° C. to about 100° C., e.g., when the battery material is a cell core.

The selection of the carrier gas and temperature depends, at least in part, on the battery material and any undesirable side reactions that may take place. As an example, a negative electrode made with a carbon active material and a copper current collector should not be heated in $O_2$ or air at a temperature higher than 150° C. because copper foil and carbon can be oxidized by oxygen. As such, with a carbon active material and $O_2$ or air carrier gas, the temperature should be 120° C. or less. However, the same negative electrode made of a carbon active material can be heated in hydrogen gas at temperatures ranging from about 150° C. to about 200° C. because there are no unfavorable reactions in the reducing environment. As still another example, a positive electrode made of metal oxide should not be heated in hydrogen gas at temperatures ranging from about 100° C. to about 300° C. because metal oxides can undesirably be reduced in these conditions. Air may be used for battery material powder, electrodes, or drying cell cores (as the non-organic solvent-containing gas 18 described further herein), at specific temperatures as long as there is no undesirable reaction. When ethanol is the organic solvent and air is the carrier gas, the temperature should be less than 250° C., as ethanol vapor and air may react at temperatures ranging from about 250° C. to about 350° C. As such, the carrier gas and temperature may be selected so that undesirable reactions (e.g., involving the active material) do not take place.

The predetermined pressure of the reaction vessel when the gaseous mixture flows through it may range from about 0 bar to about 10 bar. The predetermined pressure in the reaction vessel refers to the pressure of the environment within the reaction vessel that surrounds the battery material. A pressure sensor may be positioned inside the flow through reaction vessel in the proximity of the battery material. In an example, the pressure ranges from about 1 bar to about 2 bar. The example pressures given herein may be used with any of the battery materials (i.e., battery material powder, electrode, cell core).

After the organic solvent vapor has been removed, the concentration of residual water in the battery material which has been processed in a flow-through reaction vessel as illustrated in FIGS. 1A-1D may be less than 600 ppm. The final water level may vary depending upon the battery material. It is desirable that the water level be as low as possible. The battery material having reduced residual water content may then be used to form a lithium ion battery, a lithium sulfur battery, a lithium air battery, or a sodium sulfur battery.

Figures 2A, 2B:
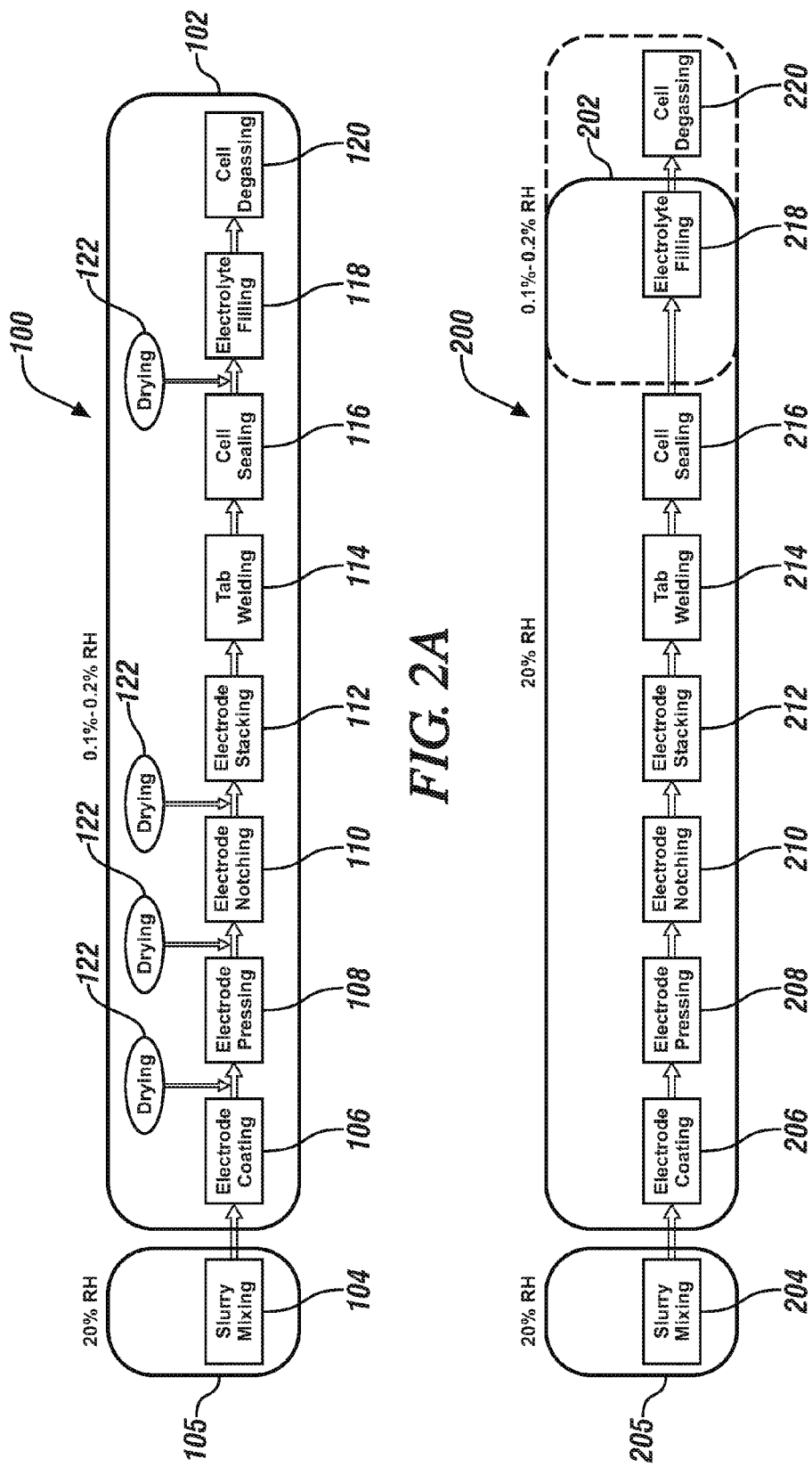
FIG. 2A is a schematic illustration of a prior method for manufacturing a battery cell in a special atmosphere of very low humidity air.
FIG. 2B is a schematic illustration of processing steps for manufacturing battery or capacitor materials and elements in a more conventional environment of air with a relative humidity of, for example, twenty percent. But at one or more stages of the manufacturing process, the materials are subjected to a water-removal process using an embodiment of a subject reaction vessel and gaseous stream producing equipment, such as is illustrated in FIGS. 1A-1D.

Referring now to FIG. 2A, there is shown a diagram illustrating a prior art method and processing environment 100 for manufacturing a battery cell, which may be, for example, a cylindrical battery, a prismatic battery, a pouch cell, or any other suitable battery cell or capacitor cell configuration. In the prior art process and processing environment 102, illustrated schematically in FIG. 2A, much of the processing of the electrode material, electrodes, and cell cores is conducted in a special dry air environment (processing area 102 as indicated in FIG. 2A) in which environment the relative humidity of the air is carefully maintained in the range of about 0.1% RH to about 0.2% RH. However, the preparation of a initial slurry 104 of a mixture of electrode material, binder resin and solvent or liquid dispersant, and conductive particles may be performed in a processing area 105 of ambient air of higher of higher relative humidity, e.g., about 20% RH.

The method steps in making battery materials and elements as illustrated in FIG. 2A (and in FIG. 2B) generally includes slurry mixing 104, electrode coating 106, electrode pressing 108, electrode notching 110, electrode stacking 112, tab welding 114, cell sealing 116, electrolyte filling 118, and cell degassing 120.

As stated, slurry mixing 104 generally includes mixing active, conductive, and binder material as a slurry under vacuum, but the finished mixture of electrode materials may be handled and stored in air at 20% RH (processing environment 105).

In prior processing practices the following steps are conducted in the very dry air atmosphere (processing environment 102). Electrode coating 106 generally includes applying layer(s) of slurry onto a relatively long current collector foil and drying it with an attached heater. Electrode pressing 108 (calendaring) generally includes compressing the electrode to a desired thickness/density. Electrode notching 110 generally includes using a slitting machine to slit/cut an electrode sheet to strips of a desired size. Electrode stacking 112 generally includes forming, e.g., by a winding machine, layers of anode, separator, and cathode into a cell core. Tab welding 114 generally includes attaching the cell to a cap. Cell sealing 116 generally includes, e.g., closing a cell case with a sealing machine/crimper, aligning the cap with the open end of the case, and sealing the case. Electrolyte filling 118 generally includes injecting the case with an electrolyte.

As depicted in FIG. 2A, the remaining portion of the manufacturing method 100 (e.g., electrode coating 106, electrode pressing 108, electrode notching 110, electrode stacking 112, tab welding 114, cell sealing 116, electrolyte filling 118, and cell degassing 120) are usually performed within a low relative humidity work area 102 (identified by the solid enclosing line). The relative humidity of the area 102 may range from about 0.1% to about 0.2%. In order to maintain the low relative humidity throughout the area 102, a large dry room may be used. In addition, after one or more of the electrode coating 106, the electrode pressing 108, the electrode notching 110, the electrode stacking 112, and the cell sealing 116 steps, a supplemental drying step 122 using heat and a vacuum may be included on the work in progress to prevent an increase in the residual water content of the battery cell being produced. In the illustration of FIG. 2A, possible supplemental drying steps 122 are indicated at five potential steps in battery manufacture, but such interposed drying steps are typically performed only once or twice during such prior art manufacturing operations.

In contrast, in method 200 shown in FIG. 2B, the relative humidity area 202 (ranging from about 0.5% RH to about 20% RH) may be used throughout the entire manufacturing process of the battery cell, except during the electrolyte filling 218 and cell degassing 220. During the electrolyte filling 218, the low relative humidity area (0.1% to 0.2% RH) may be used. This low relative humidity area may be a small dry room or a glove box. In an example, a dry glove box contains mainly argon, and can be maintained oxygen free and $N_2$ free, and has water <0.1% RH. In addition, a drying step may occur once, after cell sealing 216 (as opposed to the several drying steps in the prior art processing illustrated in FIG. 2A).

It is to be understood that the residual water content may be reduced using the examples of a flow-through reaction vessel as disclosed herein on the battery material powder before the slurry mixing 204 occurs. In another example, the residual water content may be reduced using examples of the method disclosed herein on the electrode at any point after coating an electrode slurry onto a current collector (e.g., after electrode coating 206, electrode pressing 208, and/or electrode notching 210). In yet another example, the residual water content may be reduced using examples of the method disclosed herein after the cell core has been formed (e.g., after electrode stacking 212 and/or tab welding 214. This allows the manufacturing of electrodes to occur using a less intense environment (e.g., without a dry room) with less drying involved in the overall process. Preferably, the use of the subject flow-through reaction vessel for performance of the organic water solvent dewatering process is conducted before the assembled cell cores are placed in a cell container and sealed 216 and before the cell container is filled with an electrolyte 218 and degassed 220.

As stated, the combination 10 (FIGS. 1A-1D) of a flow-through reaction vessel 12 and associated equipment for forming the gaseous mixture of an inert gas and an organic water solvent vapor may be used to remove residual water vapor from battery or capacitor electrode or cell core members at any desired stage of the step-wise manufacturing process. The size and shape of the flow-through reaction vessel is determined for easy placement of the battery/capacitor members in the reaction vessel for managed and efficient flow of the water removing stream through the pores or the cell elements. The dewatered cell elements are easily removed from the reaction vessel. And the water-containing gas mixture is easily processed to recover the inert gas and the organic solvent liquid.

The above text is presented for purposes of illustrations of embodiments of the combination of gaseous stream delivery equipment and a reaction vessel equipment for the removal or residual water from battery and capacitor materials which are to be used with a non-aqueous electrolyte solution in a dry electrochemical cell(s).

What is claimed is:

1. A combination of a reaction vessel and organic vapor stream delivery equipment for contacting battery or capacitor electrode elements, or core cells of battery or capacitor electrode elements and separator elements, with a flowing, water-removing stream of an organic vapor in a carrier gas, the reaction vessel comprising:

a box with a bottom wall surface, two side wall surfaces, a top wall surface, and two end wall surfaces which define an interior volume for receiving a predetermined quantity of water-containing electrode material elements or core cell elements, one end surface of the box having an opening for entry of a flowing stream of organic vapor in a carrier gas into the interior volume of the box, and the second end surface of the box having an opening for the exit of the water-containing, flowing stream from the interior volume of the box, the interior volume of the box further comprising a sieve plate placed adjacent the entry end surface for directing the entering flowing stream of organic vapor in a carrier gas over the full cross-section of the interior volume of the box as it flows toward the exit end of the volume of the box; and the organic vapor stream delivery equipment comprising:

a container for enclosing a volume of liquid organic solvent, isolated from water-containing ambient air, the container having an inlet for admitting a pressurized flow of dry inert gas, the inlet being located above the intended volume of organic liquid, the inlet being connected with a flow passage inside the container for receiving and directing a pressurized flow of inert carrier gas into the container and below the surface of a contained liquid organic solvent volume, and the container having an outlet for the exit of a gaseous stream of inert carrier gas and vapor of the liquid organic solvent, the outlet being located above the intended volume of the organic liquid;

a single first flow line connected to the outlet of the container for conducting the flow of the gaseous stream from the outlet of the container;

a single second flow line for conducting a pressurized flow of an inert carrier gas, the first flow line and the second flow line each terminating in a flow junction in which their flow streams are combined; and a third flow line for conduct of the inert gas and organic vapor from the outlet of the flow junction to the inlet of the reaction vessel.

2. A combination of a reaction vessel and organic vapor stream delivery equipment as stated in claim 1 in which the sieve is a flat plate with flow-through holes distributed over the surface of the plate and through the thickness of the plate.

3. A combination of a reaction vessel and organic vapor stream delivery equipment as stated in claim 2 in which the sieve plate has four edges which respectively engage the bottom wall surface, two side wall surfaces, a top wall surface, such the entire flowing stream must pass through the holes of the sieve plate.

4. A combination of a reaction vessel and organic vapor stream delivery equipment as stated in claim 1 in which the first flow line has a first valve for controlling the rate of flow of the gaseous stream through the flow line, the second flow line has a second valve for controlling the flow rate of the inert carrier gas through the second flow line, and the proportions of the inert gas and organic vapor in the third flow line are determined by the respective positions of the valves in the first and second flow lines.

5. A combination of a reaction vessel and organic vapor stream delivery equipment as stated in claim 1 in which the side wall surfaces of the box of the reaction vessel are parallel vertical rectangles which have the same lengths and heights and their lengths are longer than their heights, and in which the bottom wall surface and the top wall surface of the box are parallel horizontal rectangles which have the same lengths as the side wall surfaces.

6. A combination of a reaction vessel and organic vapor stream delivery equipment as stated in claim 5 in which the width of the box is sized to receive a flat stack of like-sized rectangular electrodes such that the edges of the electrodes fit against the side wall surfaces of the box and such that a flowing vapor stream is directed through pores of the electrodes.

7. A combination of a reaction vessel and organic vapor stream delivery equipment as stated in claim 5 in which the width of the box is sized to receive a vertical stack of like-sized rectangular electrodes such that faces of the electrodes fit against the side wall surfaces of the box and such that a flowing vapor stream is directed through pores of the electrodes.

8. A combination of a reaction vessel and organic vapor stream delivery equipment as stated in claim 5 in which the width of the box is sized to receive a flat stack of like-sized rectangular electrodes such that the edges of the electrodes fit against the side wall surfaces of the box and such that a flowing stream is directed through pores of the electrodes, the box further containing at least one vertical baffle, placed on top of the flat stack when the top of the stack does not extend the full height of the side wall surfaces, to prevent a flowing stream from flowing over the top of the stack of electrodes.

9. A combination of a reaction vessel and organic vapor stream delivery equipment as stated in claim 5 in which the width of the box is sized to receive a flat stack of like-sized rectangular cell cores of electrodes and separators such that the edges of the cell cores fit against the side wall surfaces of the box and such that a flowing stream is directed through pores of the electrodes of the cell cores.

10. A combination of a reaction vessel and organic vapor stream delivery equipment as stated in claim 5 in which the width of the box is sized to receive a vertical stack of like-sized rectangular cell cores such that faces of the cell cores fit against the side wall surfaces of the box and such that a flowing stream is directed through pores of the electrodes of the cell cores.

11. A combination of a reaction vessel and organic vapor stream delivery equipment as stated in claim 5 in which the width of the box is sized to receive a flat stack of like-sized rectangular cell cores such that the edges of the cell cores fit against the side wall surfaces of the box and such that a flowing stream is directed through pores of the electrodes of the cell cores, the box further containing at least one vertical baffle placed on top of the flat stack when the top of the stack does not extend the full height of the side wall surfaces to prevent a flowing stream from flowing over the top of the stack of cell cores.

12. A combination of a reaction vessel and organic vapor stream delivery equipment as stated in claim 1 in which the third flow line of the vapor stream delivery equipment contains a flow meter for measuring the flow rate of the predetermined proportions of the stream into the inlet of the reaction vessel box.

13. A combination of a reaction vessel and organic vapor stream delivery equipment as stated in claim 1 in which the third flow line of the vapor stream delivery equipment contains a manometer for measuring the pressure of the flow stream.

14. A combination of a reaction vessel and organic vapor stream delivery equipment as stated in claim 1 in which the exit end of the reaction vessel box contains a flow line with a valve for controlling the rate of removal of the water-containing flow stream from the reaction vessel box.

15. A combination of a reaction vessel and organic vapor stream delivery equipment as stated in claim 1 in which the surfaces of the box are each formed of one of a metal alloy, a polymeric material, or a ceramic material.

16. A combination of a reaction vessel and organic vapor system as stated in claim 1 in which the cross-section of the interior volume of the box is shaped to correspond to a stacking of battery material to be dewatered such that the stream of organic vapor in a carrier gas must flow through the pores of the battery material to reach the exit end of the volume of the box.

17. A combination of a reaction vessel and organic vapor stream delivery equipment for contacting battery or capacitor electrode elements, or core cells of battery or capacitor electrode elements and separator elements, with a flowing, water-removing stream of an organic vapor in a carrier gas, the reaction vessel comprising:

a box with a bottom wall surface, two side wall surfaces, a top wall surface, and two end wall surfaces which define an interior volume for receiving a predetermined quantity of water-containing electrode material elements or core cell elements, one end surface of the box having an opening for entry of a flowing stream of organic vapor in a carrier gas into the interior volume of the box, and the second end surface of the box having an opening for the exit of the water-containing, flowing stream from the interior volume of the box, the interior volume of the box further comprising a sieve plate placed adjacent the entry end surface for directing the entering flowing stream of organic vapor in a carrier gas over the full cross-section of the interior volume of the box as it flows toward the exit end of the volume of the box; and the organic vapor stream delivery equipment comprising:
a container for enclosing a volume of liquid organic solvent, isolated from water-containing ambient air, the container having an inlet for admitting a pressurized flow of inert gas, the inlet being located above the intended volume of organic liquid, the inlet being connected with a flow passage inside the container for receiving and directing a pressurized flow of inert carrier gas into the container and below the surface of a contained liquid organic solvent volume, and the container having an outlet for the exit of a gaseous stream of inert carrier gas and vapor of the liquid organic solvent, the outlet being located above the intended volume of the organic liquid;

a single first flow line connected to the outlet of the solvent container for conducting the flow of the gaseous stream from the outlet of the container, the first flow line containing a valve for controlling the rate of flow of the gaseous through the first flow line;

a single second flow line for conducting a pressurized flow of an inert carrier gas, the first flow line and the second flow line each terminating in a flow junction in which their flow streams are combined, the second flow line containing a second valve for controlling the rate of flow of the inert carrier gas through the second flow line; and a third flow line for conduct of the inert gas and organic vapor from the outlet of the flow junction to the inlet of the reaction vessel, the proportions of the inert gas and organic vapor in the third flow line being determined by the respective positions of the valves in the first and second flow lines.

18. A combination of a reaction vessel and organic vapor stream delivery equipment as stated in claim 17 in which the valves in the first and second flow lines are located adjacent to the flow junction.

19. A combination of a reaction vessel and organic vapor stream delivery equipment as stated in claim 17 in which the sieve is a flat plate with flow-through holes distributed over the surface of the plate and through the thickness of the plate.

20. A combination of a reaction vessel and organic vapor stream delivery equipment as stated in claim 19 in which the sieve plate has four edges which respectively engage the bottom wall surface, two side wall surfaces, a top wall surface, such the entire flowing stream must pass through the holes of the sieve plate.

* * * * *